United States Patent
Hoop et al.

(10) Patent No.: US 11,724,642 B2
(45) Date of Patent: Aug. 15, 2023

(54) VEHICLE BRAKE LIGHT CONTROL DURING ONE-PEDAL DRIVE

(71) Applicant: Ford Global Technologies, LLC, Dearborn, MI (US)

(72) Inventors: Joshua Hoop, Plymouth, MI (US); Bryan Michael Bolger, Canton, MI (US); Jacob Doan, Novi, MI (US); Devin James O'Donnell, Detroit, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 485 days.

(21) Appl. No.: 17/035,474

(22) Filed: Sep. 28, 2020

(65) Prior Publication Data
US 2022/0097600 A1 Mar. 31, 2022

(51) Int. Cl.
*B60W 10/08* (2006.01)
*B60Q 1/44* (2006.01)
*B60W 10/30* (2006.01)
*B60W 10/196* (2012.01)
*B60L 7/18* (2006.01)
*B60W 30/18* (2012.01)

(52) U.S. Cl.
CPC .......... *B60Q 1/44* (2013.01); *B60L 7/18* (2013.01); *B60W 10/08* (2013.01); *B60W 10/196* (2013.01); *B60W 10/30* (2013.01); *B60W 30/18127* (2013.01); *B60L 2260/20* (2013.01)

(58) Field of Classification Search
None
See application file for complete search history.

(56) References Cited

U.S. PATENT DOCUMENTS

| | | | | |
|---|---|---|---|---|
| 3,827,522 A | * | 8/1974 | Krause | B66F 9/0655 340/463 |
| 5,491,466 A | * | 2/1996 | Maiocco, Sr. | B60Q 1/44 340/467 |
| 8,482,397 B1 | * | 7/2013 | Tajiri | B60Q 1/44 701/79 |
| 8,942,904 B2 | | 1/2015 | Foerster et al. | |
| 10,040,390 B2 | | 8/2018 | Dudar | |
| 10,046,694 B2 | | 8/2018 | Braunberger et al. | |
| 2008/0122605 A1 | * | 5/2008 | Tengler | B60Q 1/44 340/467 |
| 2017/0361851 A1 | * | 12/2017 | Takeya | B60W 30/18181 |

FOREIGN PATENT DOCUMENTS

JP  2017222357 A  12/2017

* cited by examiner

*Primary Examiner* — Todd Melton
*Assistant Examiner* — Jason R Roberson
(74) *Attorney, Agent, or Firm* — David B. Kelley; Brooks Kushman P.C.

(57) ABSTRACT

A vehicle includes an electric machine, a brake lamp, and a controller. The controller operates the electric machine to selectively brake the vehicle according to accelerator pedal input. The controller also activates the brake lamp responsive to the accelerator pedal input being less than a first threshold demand for at least a first predetermined period of time.

18 Claims, 3 Drawing Sheets

US 11,724,642 B2

VEHICLE BRAKE LIGHT CONTROL DURING ONE-PEDAL DRIVE

TECHNICAL FIELD

This disclosure relates to control of a vehicle during, so-called one pedal driving.

BACKGROUND

The powertrain of a vehicle with an electric generator/motor may consume energy to propel the vehicle forward and generate energy to slow or stop the vehicle. This regenerative braking captures kinetic energy associated with movement of the vehicle and transforms it into electrical energy for storage in a battery.

In one pedal driving mode, a driver may not need to press the brake pedal to slow the vehicle or bring it to a stop. Just as pressing the accelerator pedal may cause the motor to propel the vehicle forward, releasing the accelerator pedal may cause the generator to regeneratively brake the vehicle without use of the friction brakes.

SUMMARY

A vehicle includes an electric machine, a brake lamp, and a controller. The controller, responsive to input indicative of one pedal drive mode being active, operates the electric machine to selectively brake the vehicle according to accelerator pedal input, and responsive to the accelerator pedal input being less than a first threshold demand for at least a first predetermined period of time, activates the brake lamp. The first threshold demand depends on a speed of the vehicle such that the first threshold demand decreases as the speed increases.

A method for controlling a vehicle includes, responsive to input indicative of one pedal drive mode being active, operating an electric machine to brake the vehicle according to accelerator pedal input, and responsive to the accelerator pedal input being less than a first threshold demand for at least a first predetermined period of time, activating a brake lamp. The first threshold demand depends on a speed of the vehicle such that the first threshold demand decreases as the speed increases.

A vehicle includes an electric machine, a brake lamp, and a controller. The controller, responsive to input indicative of one pedal drive mode being active, operates the electric machine to brake the vehicle according to accelerator pedal input, and responsive to the accelerator pedal input being less than a first threshold demand for at least a first predetermined period of time, activates the brake lamp. The first threshold demand depends on a weight of the vehicle such that the first threshold demand increases as the weight increases.

DETAILED DESCRIPTION

Figure 1:
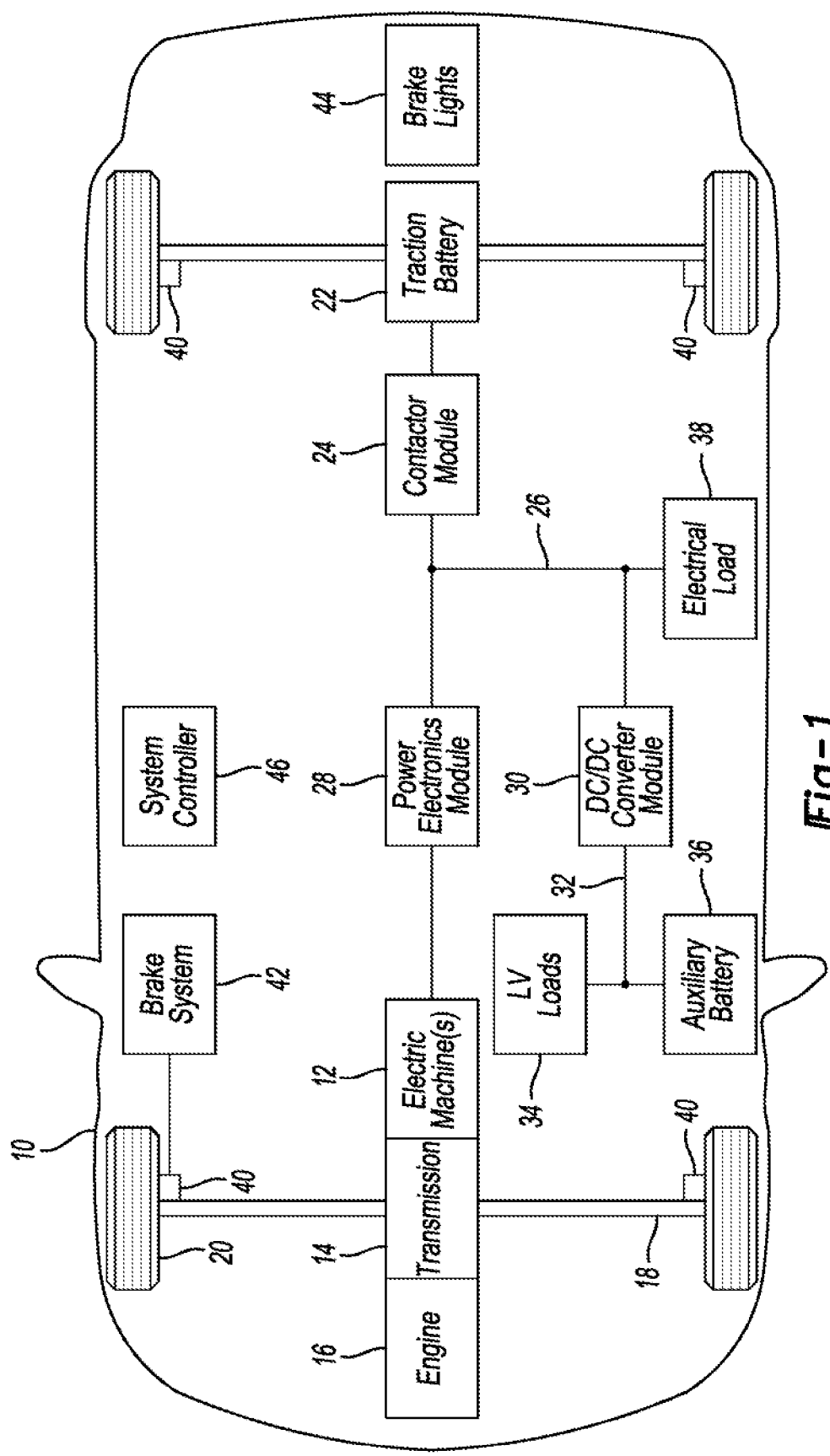
FIG. 1 is a schematic diagram of a vehicle.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted, as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

One pedal drive gives more control to the accelerator pedal with increased lift pedal regenerative braking and the ability to bring the vehicle to a slop without input from the brake pedal on a range of grades. A one pedal drive low speed controller is a feature that controls the vehicle to a complete stop from low speeds by adjusting the powertrain torque when the vehicle is in one pedal drive mode and the customer is tipping out of the accelerator pedal.

A function of one pedal drive is scheduling a high stopping deceleration at lift pedal. Federal regulations may require that a command to decelerate the vehicle above some limit illuminate the stop lamps (brake lights). Typically, this deceleration is performed by the brake pedal, and existing controls and hardware manage the stop lamp illumination in this case.

While one pedal drive is active as a result of driver selected input for example, and the vehicle is not in park and not in neutral gear, the one pedal drive feature manager may monitor the driver demand wheel torque request scheduled from the accelerator pedal. If the driver demand is less than some negative calibratable torque value (possibly a function of vehicle speed) for a calibratable period of time, the stop lamp illumination request is active. When the driver demand grows above a different calibratable torque versus speed relationship for a calibratable period of time, the stop lamp illumination request deactivates. As the driver adjusts the accelerator pedal, the driver demand signal may be noisy. Timeout and separation between the two calibration tables may be helpful to provide hysteresis and avoid chatter of the stop lamp request.

The stop lamp request may be sent from the powertrain to an antilock brake system module using a car area network interface. The activation request may be considered among other conditions and sent to a body control module using an existing interface to fulfill activation of the stop lamps if not already lit. An alternative method for generating the request can use calibratable tables of vehicle acceleration versus vehicle speed as opposed to requested torque versus speed. This may allow the powertrain to deliver less than, for example, −0.13 g deceleration at lift pedal in one pedal drive by including an interface to illuminate the stop lamps. By scheduling this based on driver demand torque where the torque is a function of speed, a flexible design that meets federal regulations may be achieved. For example, the calibration may be designed to illuminate the stop lamps all the way down to a stop and retain the stop lamps while the vehicle is stopped.

With reference to FIG. 1, electrified vehicle 10 may include one or more electric machines 12 mechanically coupled to a gearbox or hybrid transmission 14. The electric machines 12 may operate as a motor and a generator. In addition, the hybrid transmission 14 is mechanically coupled to an engine 16. The hybrid transmission 14 is also mechanically coupled to a drive shaft 18 that is mechanically coupled to wheels 20. The electric machines 12 can provide propulsion and regenerative braking capability when the engine 16 is on or off, and allow the vehicle 10 to be operated in electric mode with the engine 16 off under certain conditions. The vehicle 10, in other arrangements, may lack the engine 16 (e.g., a battery electric vehicle). Other architectures are also contemplated.

A battery pack or traction battery 22 stores energy that can be used by the electric machines 12. The traction battery 22 may provide a high voltage direct current (DC) output. A contactor module 24 may include one or more contactors configured to isolate the traction battery 22 from a high voltage bus 26 when opened and connect the traction battery 22 to the high voltage bus 26 when closed. The high voltage bus 26 may include power and return conductors for carrying current. One or more power electronics modules 28 (e.g., inverters) may be electrically coupled to the high voltage bus 26. The power electronics modules 28 are also electrically coupled to the electric machines 12 and provide the ability to bi-directionally transfer energy between the traction battery 22 and the electric machines 12. For example, the traction battery 22 may provide a DC voltage while the electric machines 12 may operate with a three phase alternating current (AC) to function. The power electronics module 28 may convert the DC voltage to three phase AC current to operate the electric machines 12, in regenerative mode, the power electronics module 28 may convert the three phase AC current from the electric machines 12 acting as generators to DC voltage compatible with the traction battery 22.

In addition to providing energy for propulsion, the traction battery 22 may provide energy for other vehicle electrical systems. The vehicle 10 may include a DC/DC converter module 30 that converts the high voltage DC output from the high voltage bus 26 to a low voltage DC level of a low voltage bus 32 that is compatible with low voltage loads 34. An output of the DC/DC converter module 30 may be electrically coupled to an auxiliary battery 36 (e.g., 12V battery) for charging the auxiliary battery 36. The low voltage loads 34 may be electrically coupled to the auxiliary battery 36 via the low voltage bus 32. One or more high voltage electrical loads 38 may be coupled to the high voltage bus 26. The high voltage electrical loads 38 may have an associated controller that operates and controls the high voltage electrical loads 38 when appropriate. Examples of high voltage electrical loads 38 include a fan, an electric heating element, an air conditioning compressor, etc.

Wheel brakes 40 may be provided for braking and preventing motion of the vehicle 10. The wheel brakes 40 may be hydraulically actuated, electrically actuated, or some combination thereof. The wheel brakes 40 may be a part of a brake system 42. The brake system 42 may include other components such as brake lights 44. For simplicity, FIG. 1 depicts a single connection between the brake system 42 and one of the wheel brakes 40. A connection between the brake system 42 and the other wheel brakes 40 is implied. The brake system 42 may include a controller to monitor and coordinate its activities. The brake system 42 may monitor the brake components and control the wheel brakes 40. The brake system 42 may respond to driver commands and may also operate autonomously to implement features such as stability control. The controller of the brake system 42 may implement a method of applying a requested brake force when requested by another controller or tub-function.

Electronic modules in the vehicle 10 may communicate via one or more vehicle networks. The vehicle networks may include a plurality of channels for communication. One channel of the vehicle network may be a serial bus such as a Controller Area. Network (CAN). One of the channels of the vehicle network may include an Ethernet network defined by Institute of Electrical and Electronics Engineers (IEEE) 802 family of standards. Additional channels of the vehicle network may include discrete connections between modules and may include power signals from the auxiliary battery 36. Different signals may be transferred over different channels of the vehicle network. For example, video signals may be transferred over a high speed channel (e.g., Ethernet) while control signals may be transferred over CAN or discrete signals. The vehicle network may include any hardware and software components that aid in transferring signals and data between modules. The vehicle network is not shown in FIG. 1, but it may be implied that the vehicle network may connect to any electronic modules that are present in the vehicle 10.

A vehicle system controller (VSC) 46 may be present to coordinate the operation of the various components, and execute or cause the algorithm described below to be executed by another controller.

Figure 2:
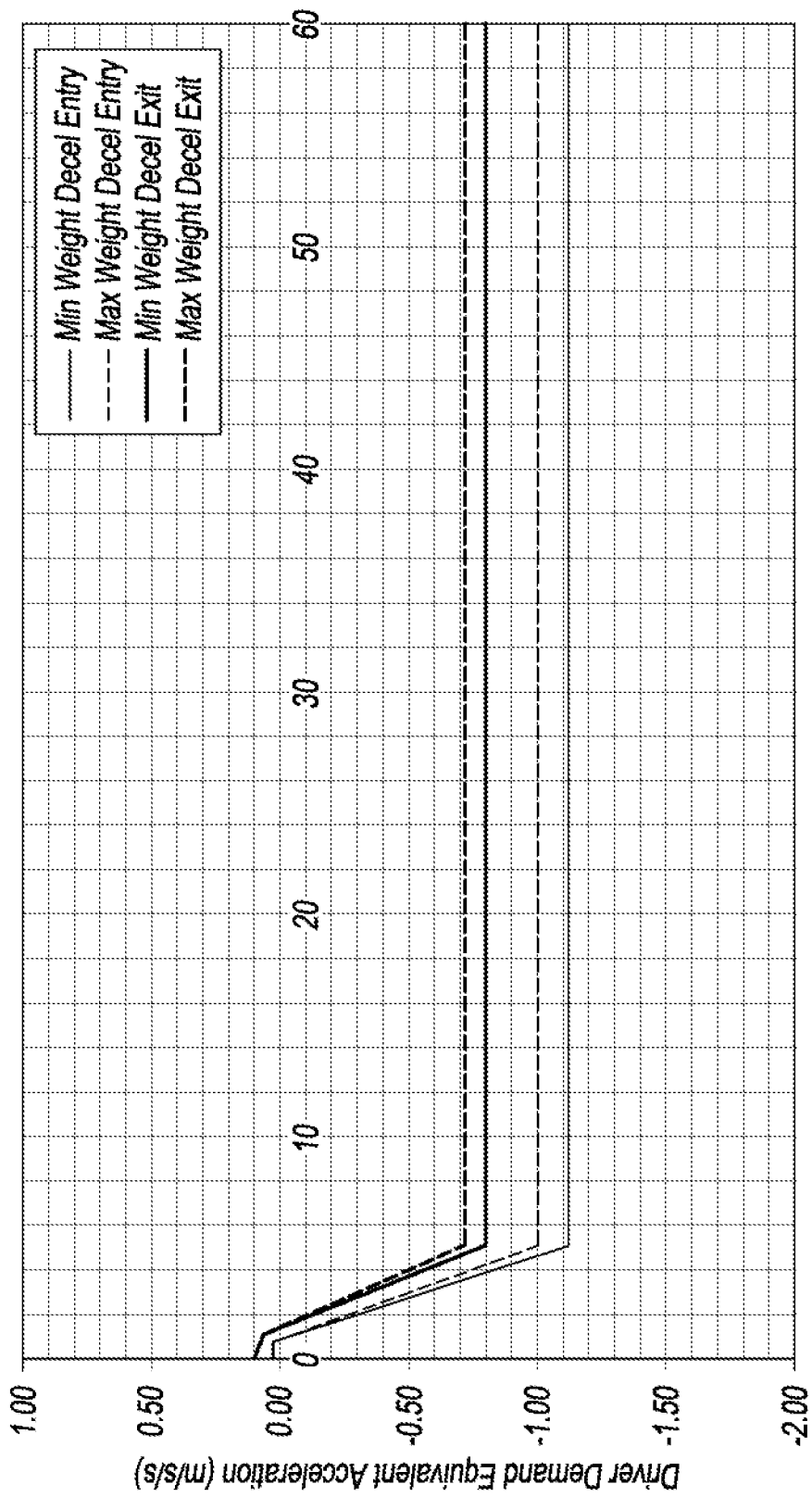
FIG. 2 is a plot of brake lamp activate and deactivate thresholds versus vehicle speed.

With reference to FIG. 2, example deceleration entry and exit thresholds for brake lamp control are shown versus speed (and weight). For driver demand equivalent acceleration values, derived from accelerator pedal input during one pedal drive, less than the minimum deceleration entry threshold values, the brake lamps are activated. Once the brake lamps are activated, for driver demand equivalent acceleration values exceeding the maximum deceleration exit threshold values, the brake lamps are deactivated. The threshold values can vary with vehicle speed and/or vehicle weight as shown. Driver demand equivalent acceleration values can be proportional to pedal position or relative change in pedal position as known in the art.

Figure 3:
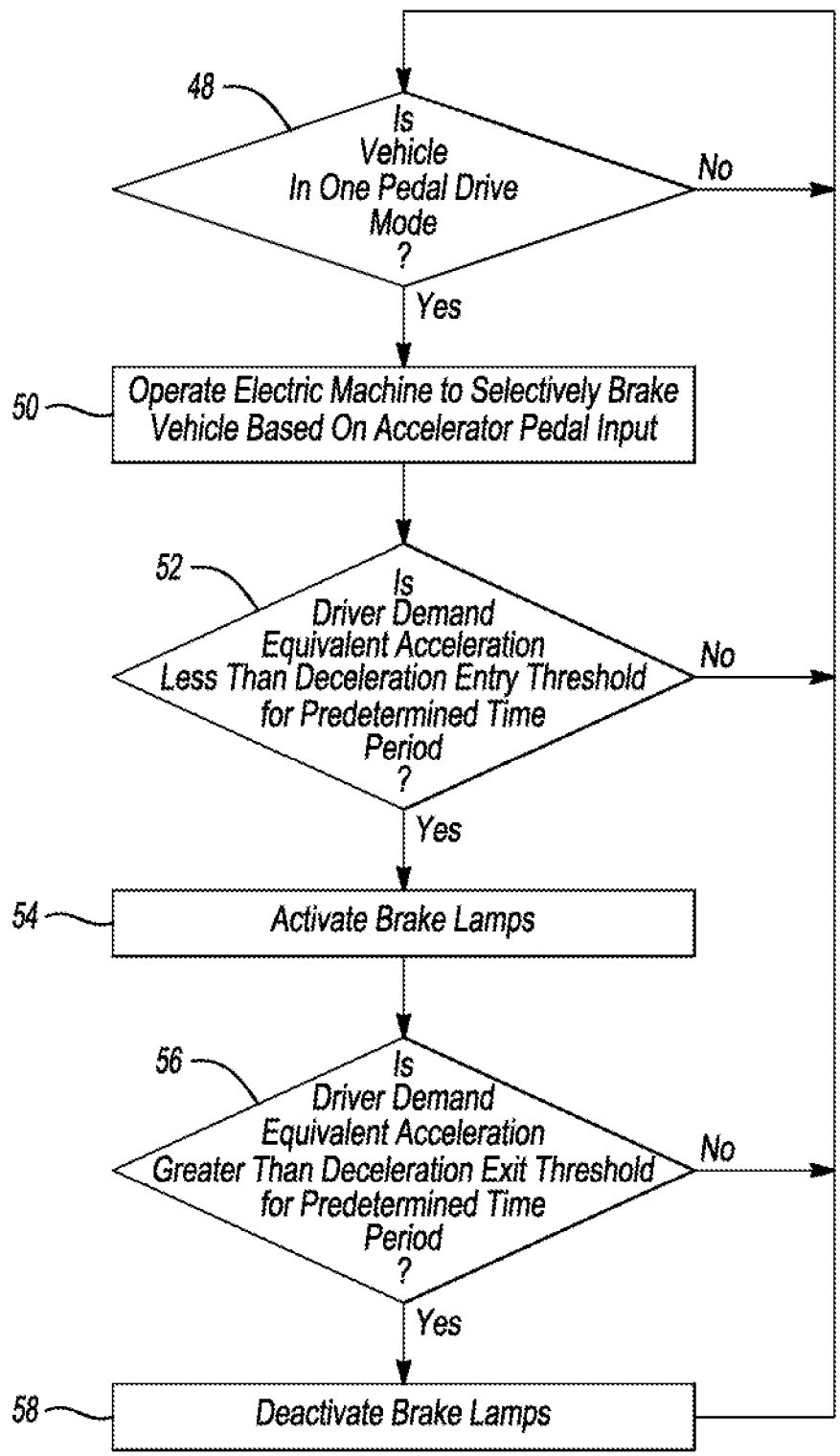
FIG. 3 is a flow chart of an algorithm for controlling a brake light.

With reference to FIG. 3, at operation 48 it is determined, using input from the driver via a button or switch for example, whether the vehicle is in one pedal drive mode. If no, the algorithm returns to operation 48. If yes the electric machine is operated to selectively brake the vehicle based on accelerator pedal input at operation 50. At operation 52, it is determined whether the driver demand equivalent acceleration (as derived from the accelerator pedal input) is less than a deceleration entry threshold (see, e.g., FIG. 2) for at least a predetermined period of time (e.g., 1.5 seconds). If no, the algorithm returns to operation 48. If yes, the brake lamps are activated at operation 54. At operation 56, it is determined whether the driver demand equivalent acceleration is greater than a deceleration exit threshold (see, e.g., FIG. 2) for at least a predetermined period of time (e.g., 1.5 seconds). If no, the algorithm returns to operation 48. If yes, the brake lamps are deactivated at operation 58. The algorithm then returns to operation 48.

Control logic or functions performed by one or more controllers may be represented by flow charts or similar diagrams in any of the various figures. These figures provide representative control strategies and/or logic that may be implemented using one or more processing strategies such as event-driven, interrupt-driven, multi-tasking, multi-threading, and the like. As such, various steps or functions illustrated may be perforated. In the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but are provided for ease of illustration and description.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as Read. Only Memory (RUM) devices and information alterably stored on writeable storage media such as floppy disks, magnetic tapes, Compact Discs (CDs). Random Access Memory (RAM) devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
an electric machine;
a brake lamp; and
a controller programmed to, responsive to input indicative of one pedal drive mode being active,
operate the electric machine to selectively brake the vehicle according to accelerator pedal input, and
responsive to the accelerator pedal input being less than a first threshold demand for at least a first predetermined period of time, activate the brake lamp, wherein the first threshold demand depends on a speed of the vehicle such that the first threshold demand decreases as the speed increases.

2. The vehicle of claim 1, wherein the controller is further programmed to, responsive to the brake lamp being activated and the accelerator pedal input being greater than a second threshold demand for at least a second predetermined period of time, deactivate the brake lamp.

3. The vehicle of claim 2, wherein the second threshold demand depends on the speed such that the second threshold demand decreases as the speed increases.

4. The vehicle of claim 2, wherein the second threshold demand depends on an estimated weight of the vehicle such that the second threshold demand increases as the weight increases.

5. The vehicle of claim 2, wherein the second threshold demand is greater than the first threshold demand.

6. The vehicle of claim 1, wherein the first threshold demand further depends on an estimated weight of the vehicle such that the first threshold demand increases as the weight increases.

7. A method for controlling a vehicle comprising:
by a controller,
responsive to input indicative of one pedal drive mode being active,
operating an electric machine to brake the vehicle according to accelerator pedal input, and
responsive to the accelerator pedal input being less than a first threshold demand for at least a first predetermined period of time, activating a brake lamp, wherein the first threshold demand depends on a speed of the vehicle such that the first threshold demand decreases as the speed increases.

8. The method of claim 7 further comprising, responsive to the brake lamp being activated and the accelerator pedal input being greater than a second threshold demand for at least a second predetermined period of time, deactivating the brake lamp.

9. The method of claim 8, wherein the second threshold demand depends on the speed such that the second threshold demand decreases as the speed increases.

10. The method of claim 8, wherein the second threshold demand depends on an estimated weight of the vehicle such that the second threshold demand increases as the weight increases.

11. The method of claim 8, wherein the second threshold demand is greater than the first threshold demand.

12. The method of claim 7, wherein the first threshold demand further depends on an estimated weight of the vehicle such that the first threshold demand increases as the weight increases.

13. A vehicle comprising:
an electric machine;
a brake lamp; and
a controller programmed to, responsive to input indicative of one pedal drive mode being active,
operate the electric machine to brake the vehicle according to accelerator pedal input, and
responsive to the accelerator pedal input being less than a first threshold demand for at least a first predetermined period of time, activate the brake lamp, wherein the first threshold demand depends on a weight of the vehicle such that the first threshold demand increases as the weight increases.

14. The vehicle of claim 13, wherein the first threshold demand further depends on a speed of the vehicle such that the first threshold demand decreases as the speed increases.

15. The vehicle of claim 13, wherein the controller is further programmed to, responsive to the brake lamp being activated and the accelerator pedal input being greater than a second threshold demand for at least a second predetermined period of time, deactivate the brake lamp.

16. The vehicle of claim 15, wherein the second threshold demand depends on a speed of the vehicle such that the second threshold demand decreases as the speed increases.

17. The vehicle of claim 15, wherein the second threshold demand depends on the weight such that the second threshold demand increases as the weight increases.

18. The vehicle of claim 15, wherein the second threshold demand is greater than the first threshold demand.

* * * * *